United States Patent
Moss et al.

(10) Patent No.: US 12,138,542 B2
(45) Date of Patent: Nov. 12, 2024

(54) VIRTUAL ENVIRONMENT DEVELOPMENT METHOD AND SYSTEM

(71) Applicant: Sony Interactive Entertainment Inc., Tokyo (JP)

(72) Inventors: Guy Moss, Turnbridge Wells (GB); Timothy Bradley, London (GB); Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 322 days.

(21) Appl. No.: 17/867,896

(22) Filed: Jul. 19, 2022

(65) Prior Publication Data
US 2023/0023980 A1    Jan. 26, 2023

(30) Foreign Application Priority Data
Jul. 22, 2021 (GB) ..................... 2110542

(51) Int. Cl.
*A63F 13/56* (2014.01)
*A63F 13/69* (2014.01)
*G06N 3/08* (2023.01)

(52) U.S. Cl.
CPC .............. *A63F 13/56* (2014.09); *A63F 13/69* (2014.09); *G06N 3/08* (2013.01)

(58) Field of Classification Search
CPC .......... A63F 13/56; A63F 13/69; A63F 13/58; A63F 13/67; A63F 13/55; G06N 3/08;
(Continued)

(56) References Cited

U.S. PATENT DOCUMENTS

| 11,554,324 B2 * | 1/2023 | Khan ..................... G06V 20/47 |
| 2013/0288757 A1 * | 10/2013 | Guthridge ............... A63F 13/67 463/2 |

(Continued)

FOREIGN PATENT DOCUMENTS

| CN | 110134375 A | 8/2019 |
| CN | 111450537 A | 7/2020 |

(Continued)

OTHER PUBLICATIONS

Extended European Search Report for corresponding EP Application No. 22184809.6, 10 pages, dated Feb. 1, 2023.
(Continued)

*Primary Examiner* — Pierre E Elisca
(74) *Attorney, Agent, or Firm* — Matthew B. Dernier, Esq.

(57) ABSTRACT

A method of controlling at least a first non-player object within a virtual environment of an application includes: selecting a template non-player object behavioural AI model, the AI model being previously trained separately to the application using reinforcement learning to characterise behaviour of a respective non-player object type, from among a plurality of template AI models, associating one or more non-player objects of the application with the selected template AI model, and for the or each associated non-player object, inputting application state information to an input interface of the template AI model for receiving state information relevant to the associated non-player object's type, and receiving from an output interface of the template AI model non-player object state information, and then updating the state of the respective non-player object for the virtual environment of the application responsive to the received non-player object state information.

15 Claims, 2 Drawing Sheets

(58) Field of Classification Search
CPC .......... G06N 3/006; G06N 20/00; G06N 3/00; G06F 8/36
USPC .......................................................... 463/31
See application file for complete search history.

(56) References Cited

U.S. PATENT DOCUMENTS

| | | | |
|---|---|---|---|
| 2017/0087469 A1* | 3/2017 | Hardee | G07F 17/3227 |
| 2018/0314942 A1 | 11/2018 | Shinn | |
| 2019/0102684 A1 | 4/2019 | Beran | |
| 2019/0354759 A1 | 11/2019 | Somers | |
| 2020/0159871 A1* | 5/2020 | Bowen | G06T 11/60 |
| 2020/0160612 A1* | 5/2020 | Bowen | G06F 30/20 |
| 2020/0197811 A1 | 6/2020 | Eatedali | |
| 2020/0238178 A1 | 7/2020 | Lin | |
| 2021/0086089 A1* | 3/2021 | Pardeshi | A63F 13/67 |
| 2021/0402299 A1* | 12/2021 | Khan | A63F 13/67 |
| 2021/0402308 A1* | 12/2021 | Khan | H04N 21/47205 |

FOREIGN PATENT DOCUMENTS

| | | |
|---|---|---|
| CN | 111632379 A | 9/2020 |
| CN | 112402986 A | 2/2021 |

OTHER PUBLICATIONS

Miyashita Shohei et al: "Developing game AI agent behaving like human by mixing reinforcement learning and supervised learning", 2017 18TH IEEE/ACIS International Conference on Software Engineering Artificial Intelligence, Networking and Parallel/Distributed Computing (SNPD), IEEE, pp. 489-494, Jun. 26, 2017.

Search and Examination Report for corresponding GB Application No. GB2110542.4, 10 pages, dated Jan. 24, 2022.

* cited by examiner

VIRTUAL ENVIRONMENT DEVELOPMENT METHOD AND SYSTEM

BACKGROUND OF THE INVENTION

Field of the Invention

The present invention relates to a virtual environment development system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

When developing a virtual environment for a videogame, simulation, or other application, it is often important to include non-user characters (typically referred to a non-player characters, or NPCs). These characters can range in significance from being companions of the user, to quest givers, opponents, or dynamic elements of the background scene.

Providing NPCs with appropriate functionality so that they interact with the user, other NPCs and/or the environment, preferably without too much repetition of behaviour, is a burdensome task for an application developer, and the trade-off between development time and NPC behaviour development can impact the quality of the eventual NPCs.

The present invention seeks to mitigate or alleviate this problem.

SUMMARY OF THE INVENTION

Various aspects and features of the present invention are defined in the appended claims and within the text of the accompanying description.

In a first aspect, a method of controlling at least a first non-player object within a virtual environment of an application is provided in accordance with claim 1.

In another aspect, a system for controlling at least a first non-player object within a virtual environment of an application is provided in accordance with claim 13.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A virtual environment development method and system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
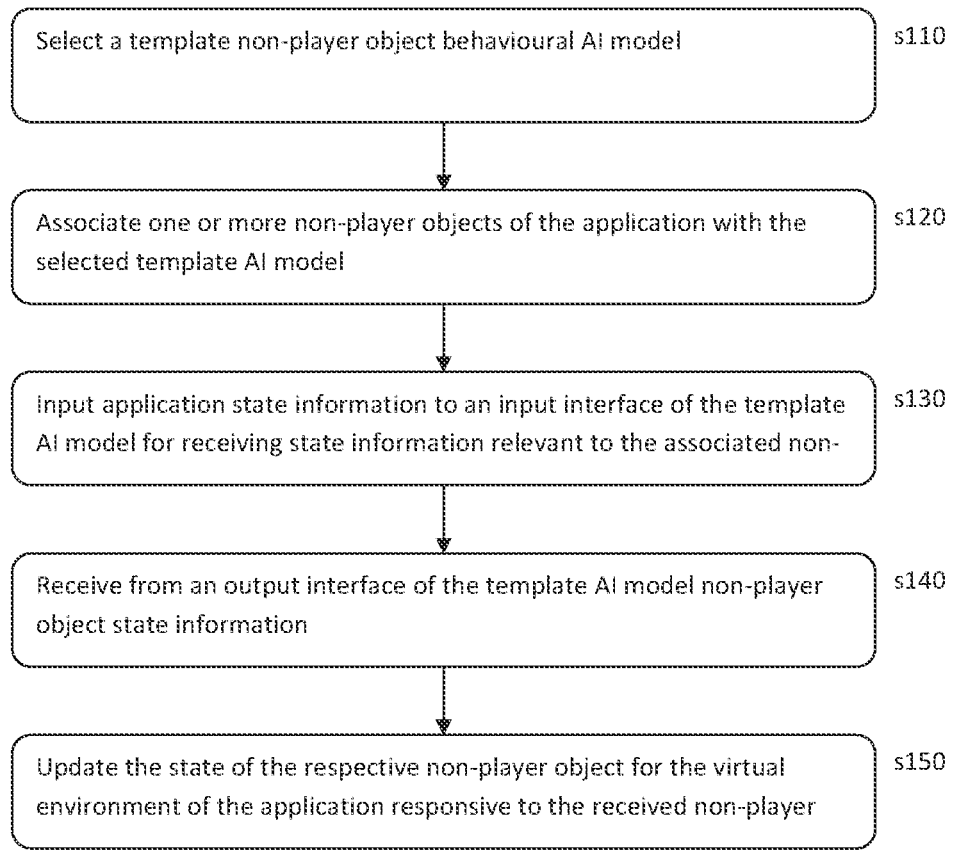
FIG. 1 is a flow diagram of a method of controlling at least a first non-player object within a virtual environment of an application in accordance with embodiments of the description.

Referring now to the drawings, wherein like reference numerals designate identical or corresponding parts throughout the several views, FIG. 1 shows a flow diagram of a virtual environment development method in accordance with embodiments of the present description.

The method enables controlling at least a first non-player object within a virtual environment of an application. Example objects include people, animals, monsters, robots, insects, or any object that may behave in a manner responsive to the environment, optionally and typically in a manner that is not limited to a physics simulation of response but also includes one or more internal drives or goals.

The method comprises a first step s110 of selecting a template non-player object behavioural AI model, the AI model being previously trained separately to the application using reinforcement learning (or any suitable supervised or semi supervised learning scheme), to characterise behaviour of a respective non-player object type, from among a plurality of template AI models.

The method may optionally comprise selecting a template non-player object behavioural AI model, the AI model being previously trained separately to the application using reinforcement learning (or any suitable supervised or semi supervised learning scheme) to characterise one or more behaviours of a respective non-player object type.

This template non-player object behavioural AI model may then be refined or tuned for the desired application as follows.

Firstly, by providing a training virtual environment separate from the application environment.

Secondly, by associating one or more non-player objects with the selected template AI model (hence letting the one or more non-player objects embody the selected template AI model, or conversely imbuing the one or more non-player objects with the AI model of the selected template);

Then for the or each associated non-player object, thirdly inputting training state information to an input interface of the template AI model for receiving generic state information relevant to the associated non-player object's type, the training state information corresponding to state information of the application (e.g. information about the environment appropriate to the template AI model—for example whether a prey animal is within a field of view and/or audible range, or the direction/distance to food, danger, another object of the same type, prey, a predator, an environmental hazard/obstruction/discontinuity, or the like).

Fourthly receiving from an output interface of the template AI model non-player object state information (for example one or more of a change in direction and/or movement, a value corresponding arousal of fear, hunger, anger, predation, or the like, a particular action or response unique to that template such as jumping, camouflaging or the like, or any other suitable response to the input environmental state information).

Fifthly comparing this state against a preferred state to generate a reward value (in the example of reinforcement learning—alternatively deriving a cost function for a difference between outputs and a target behaviour in a more general supervised learning scheme, or selecting a best response based on a cost function in an unsupervised learning scheme).

Sixthly, feeding the reward value back to the respective template AI model to reinforce the preferred state (in the example of reinforcement learning, or alternatively refining the model using the technique appropriate to the cost function and architecture of a particular choice of supervised or unsupervised machine learning system).

And seventhly, updating the state of the respective non-player object for the training environment (in other words implementing the response of the AI model using the respective non-player object, thereby also updating the environmental state of that object for a further round of training, and so on as required until the AI model exhibits the desired/appropriate behaviour.

In this way, the training of the selected template AI model may be refined within a development environment comprising the relevant environmental stimuli for the template type in order to exhibit the desired/appropriate behaviour. Notably duplicates of a selected template AI model may be refined slightly differently for the same non-player object, to provide different personalities when distributed within a group of such objects.

It will be appreciated that the selected template non-player object behavioural AI model may itself be initially trained in such a manner as well, with the goals and/or behaviours for the desired application being replaced with possibly more general the goals and/or behaviours that typify the intended template type.

The template type may be an archetype such as the people, animals, etc., mentioned previously herein, and/or may relate to an overall mode of behaviour, such as flocking or swarming, avoiding its own kind or some other environment feature, seeking a specific kind or some other environment feature, being aggressive/predatory or non-aggressive, and the like.

As a non-limiting example, a plurality of template non-player object behavioural AI models may respectively characterise the behaviour of one selected from the list consisting of:
  i. a non-goal driven ambient creature;
  ii. a goal driven ambient creature;
  iii. a prey creature; and
  iv. a predator creature.

Non-goal driven ambient creatures may include insects or birds, that move in response to the environment or each other (e.g. flocking) but do not necessarily try to achieve anything.

Meanwhile goal driven creatures are trained to increase or maximise achievement of a goal, such as eating food, finding shelter, or attacking/fleeing the player. They may also exhibit non-goal driven behaviours such a flocking.

Alternatively or in addition to other environmental factors, predator creatures and prey creatures are typically trained to respond to each other and optionally also the user, as well as having a goal of attacking prey or fleeing predators, as appropriate.

Notably, any such goals can be unrelated to goals of a game in which the object exists. Hence such goals may optionally relate to the environmental ambience, or to a story point, but not to game progress or increasing some form of user score or completion.

Similarly as a non-limiting example, a plurality of template non-player object behavioural AI models may respectively characterise behaviour of one selected from the list consisting of:
  i. a member of a calm non-goal driven crowd;
  ii. a member of a calm goal driven crowd;
  iii. a member of a panicked non-goal driven crowd; and
  iv. a member of a panicked goal driven crowd.

Again the AI models address different needs; a calm non-goal driven crowd may provide general ambiance with in a city. Meanwhile a calm goal driven crowd may help to propel a narrative by moving towards a particular location, or exiting a location, or providing or removing a resource. Meanwhile a panicked crowd may have different behaviours, such as a propensity to attack the user of they are in the way, or a desire to avoid other member of the crowd (which again may create emergent behaviours when at odds with a goal such as trying to reach a common destination or resource).

It will be appreciated that as appropriate some or all members of such a crowd (or creatures) may swap between template AI models to change behaviour as the application requires.

As noted elsewhere herein the non-player object is not limited to things that may be traditionally thought of as alive of having independent agency (such as people, creatures or robots) but may also relate to other objects whose behaviour is not, or is not solely determined by virtual physics in the environment.

Hence as non-limiting examples a plurality of template non-player object behavioural AI models may respectively characterise behaviour of one selected from the list consisting of:
  i. a vehicle; and
  ii. a structure.

Here for example the vehicle may be a race car, a pursuit vehicle, or ambient traffic. Meanwhile a structure may be a street, house or room, where lights or a fire or other 'outputs' of the structure may activate in response to the environment, such as time of day, weather, number of occupants, and the like.

It will be appreciated that suitable choices of behaviour in response to different environmental stimuli may thus produce emergent behaviour; for example training a creature to eat food but also to be afraid of fire or noise may automatically result in creatures that try to consume the user's resources but can be kept at bay by using fire or loud noises (although perhaps predator AI models will have been trained to be attracted to loud noises, resulting in a trade-off for the user). As noted above, where different personalities have also been trained for a single type of non-player object, then these can provide further variability, or create new emergent behaviours depending on the proportion and current distribution of, for example, brave or fearful prey animals in a herd when approached by the user.

Returning to the method, a second step s120 comprises associating one or more non-player objects of the application with the selected template AI model. Hence once an AI template model has been trained (and optionally refined as described elsewhere herein), this model is selected to drive one or more non-player objects of the application, typically with each such object using a respective instance of the model, or optionally the model being re-used successively for each such object, or a mixture of the two approaches (for example a plurality of models running in parallel, each used multiple times to drive respective ones or a large plurality of non-player objects, such as a flock, swarm or herd of creatures).

Where the AIs run in parallel, this will typically be on a graphics processing unit, where respective processes have limited computing resources (e.g. respective processor threads and memory allocations).

Consequently in such an embodiment, when running a plurality of template AI models in parallel on parallel computing hardware to control a plurality of non-player objects then optionally respective template AI models are previously trained to operate with computing resources limited to those available when running on the parallel computing hardware.

Returning to the method of FIG. 1, for the or each associated non-player object the method comprises a third step s130 of inputting application state information to an input interface of the template AI model for receiving state information relevant to the associated non-player object's type.

In other words, as noted above different template AI models for different types of non-player object may have different inputs (and/or the same inputs represent different things depending on the training regime).

Such inputs may relate to the background state of the environment (e.g. the type of terrain the object is on, any obstacles in its path, relevant visual or audio triggers, and the like), or the state of neighbouring objects (e.g. for flocking behaviour), or goal-based information such as the distance and/or direction to a goal.

Non-limiting examples of such inputs include one or more selected from the list consisting of:
 i. a flow direction of a medium comprising the non-player object;
 ii. a light position or direction;
 iii. a heat position or direction;
 iv. a sound position or direction; and
 v. a resource position or direction.

Similarly, non-limiting examples of such inputs include one or more selected from the list consisting of:
 i. a distance to a goal location;
 ii. a direction to a goal location;
 iii. a landscape gradient in at least current direction;
 iv. a distance to a solid object in at least current direction;
 v. a distance to a similar non-player object;
 vi. a distance to a prey non-player object;
 vii. a distance to a predator non-player object; and
 viii. a distance to a player.

Other such inputs may relate to the preferred behaviour of the non-player object, for example as determined by the application and/or as scripted by the developer. Non-limiting examples of such inputs include one or more selected from the list consisting of:
 i. an urgency for the non-player object to reach a goal;
 ii. an urgency for the non-player object to reach a resource;
 iii. a fear of an environmental feature;
 iv. an attraction to an environmental feature;
 v. a fear of another non-player object;
 vi. an attraction to another non-player object;
 vii. a preferred position relative to another non-player object; and
 viii. a preferred position relative to the player.

As noted elsewhere herein, such inputs are typically respective binary or scalar values input to the AI template model during training and/or refinement and associated with target output values corresponding to responses of a non-player object of that template type to such inputs.

Returning to the method of FIG. 1, for the or each associated non-player object the method comprises a fourth step s140 of receiving from an output interface of the template AI model non-player object state information. In other words, the output values of the trained or refined AI template model generated in response to the input values.

These outputs may relate to navigation, for example as a change in position, orientation and/or speed. Similarly they may relate to situational awareness, such as a change in a level or alertness, optionally for a specific thing such as the user, a resource, or an environmental hazard. Likewise they may relate to the behaviour of the non-player object, such as a level of urgency or panic in their behaviour (which for example may be used as a weighting or multiplier by the application when translating outputs of the AI model into portrayed actions of the objects within the application).

Hence non-limiting examples of received non-player object state information comprise one or more selected from the list consisting of:
 i. a non-player object position;
 ii. a non-player object direction;
 iii. a non-player object velocity;
 iv. a goal attraction value;
 v. a resource attraction value;
 vi. a proximity awareness value;
 vii. a resource level value;
 viii. a fear value; and
 ix. an urgency value.

Here 'goal attraction' may simply describe a degree of attraction to a goal (for example for the purpose of deciding between which of competing stimuli to act upon), or may be more complex based on trained context. For example attractions of the non-player object to other things in the virtual environment may be a factor; if the goal is to reach the player, but the non-player object is hungry and near food, then the goal attraction value may be reduced or negative to encourage the non-player object to eat and survive. Similarly proximity to shelter or cover from weaponry of the user may override the general goal, so that non-player objects to not suicidally attack the user.

Meanwhile a proximity awareness value may indicate when a non-player object is able to become goal oriented, or detect a resource, or the like. The value may also act as a multiplier or weight, either within the AI model itself or as part of the calculation of a reward function during training (for example, there is no point penalising or rewarding an object for behaviour it is not supposed to exhibit until it is 'aware' of the stimulus in the environment).

Returning again to the method of FIG. 1, a fifth step s150 comprises updating the state of the respective non-player object for the virtual environment of the application responsive to the received non-player object state information.

This typically involves the application taking the outputs of the AI model for the respective non-player object, and using these to update the object within the application environment. As noted elsewhere herein, this may relate to updating the position, orientation, speed or pose of the object, and/or altering its situational awareness (which in turn may trigger predefined behavioural changes, such as abandoning a pre-set path to search for the user, or change a default sound of the object), and/or altering behavioural aspects of the object chosen to be controlled by the AI model, such as for example fear or panic. The application may thus use the received non-player object state information from the AI model to update the non-player object's state within the game, and optionally portray this as needed (noting that non-player objects may not currently be visible or audible in the environment, even if they are being maintained within it by the application).

Hence a sixth step (not shown in FIG. 1) is to optionally portray the updated non-player object (e.g. render it on screen and/or output its audio) to the user of the application.

The AI model(s) may be managed by the application itself, or by a system OS, middleware layer, and/or helper app associated with the system OS. Hence the method may optionally comprise providing an application interface between the application and a system (whether the OS or a helper app) managing one or more template AI models, with the application specifying via the application interface the required number and type of template AI models and providing application state information for input by the system to respective template AI models, and the system providing to the application via the application interface non-player object state information.

The app or the system may also implement resource management functions; for example if there are not enough resources to run the required number of AI instances (or iterations) for the present number of non-player objects being updated (e.g. within a frame, or within a longer period such as for example a 2, 3, or 4 frame period or whatever the update period for a given type of non-player object is chosen to be, e.g. by the developer), then the system may duplicate outputs of an AI for other objects of the same type, for example as a function of proximity to an object that has have an AI model processed for it (on the basis that the most proximate non-player objects are the most likely to respond to the application state in the same way). Consequently, if this approach is used then the system may also schedule non-player objects for AI model processing according to position, for example first processing every second, third or fourth object of a particular type in a spatial distribution so that if the system runs low on time or resources, the results can be efficiently duplicated to neighbouring objects (or interpolated for an object located between two objects for which AI models were run).

In any event, it will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 2:
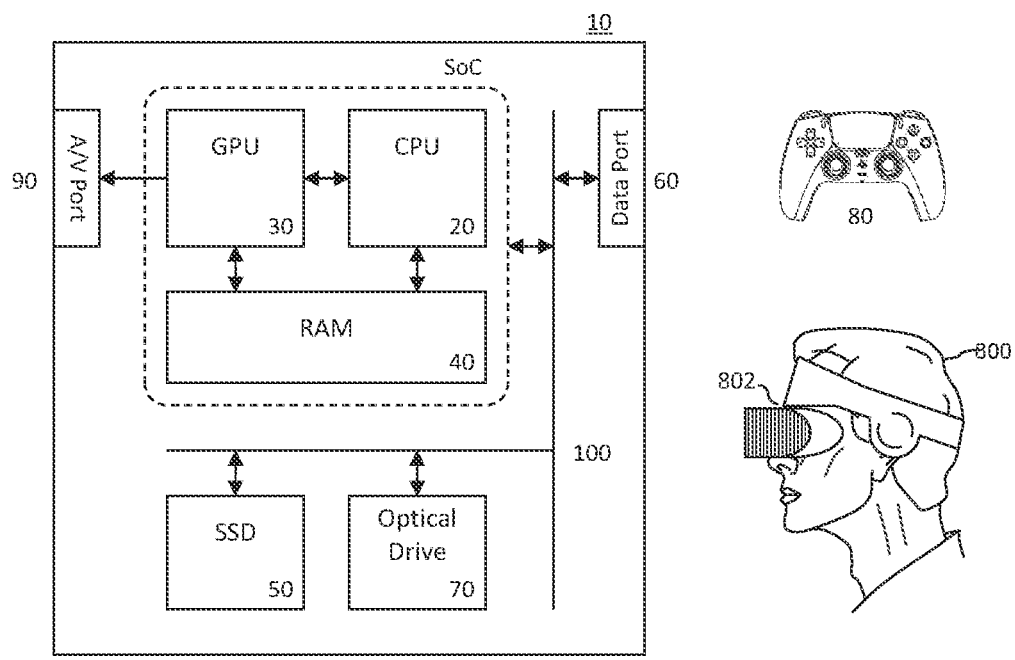
FIG. 2 is a schematic diagram of a system for controlling at least a first non-player object within a virtual environment of an application in accordance with embodiments of the description.

Referring now to FIG. 2, an example of suitable hardware is an entertainment system 10 such as the Sony® PlayStation 5 ® (PS5), or a similar console or computer.

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC).

The entertainment device also comprises RAM 40, and may either have separate RAM for each of the CPU and GPU, or shared RAM as in the PS5. The or each RAM can be physically separate, or integrated as part of an SoC. Further storage is provided by a disk 50, either as an external or internal hard drive, or as an external solid state drive, or an internal solid state drive.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800. Another example is a TV (not shown).

Accordingly, in a summary embodiment of the present description a system (for example entertainment system 10) for controlling at least a first non-player object within a virtual environment of an application comprises the following Firstly, a selection processor (such as CPU 20 and/or GPU 30) configured (for example by suitable software instruction) to select a template non-player object behavioural AI model, the AI model being previously trained separately to the application using reinforcement learning to characterise behaviour of a respective non-player object type, from among a plurality of template AI models.

The system also comprises an association processor (again such as CPU 20 and/or GPU 30) configured (again for example by suitable software instruction) to associate one or more non-player objects of the application with the selected template AI model For the or each associated non-player object, an AI model management processor (again such as CPU 20 and/or GPU 30) is configured (again for example by suitable software instruction) to input application state information to an input interface of the template AI model for receiving generic state information relevant to the associated non-player object's type; and receive from an output interface of the template AI model non-player object state information; and The system also comprises an update processor (again such as CPU 20 and/or GPU 30) configured (again for example by suitable software instruction) to update the state of a respective non-player object for the virtual environment of the application responsive to the received non-player object state information.

Instances of this summary embodiment implementing the methods and techniques described herein (for example by use of suitable software instruction) are envisaged within the scope of the application, including but not limited to that:
  the system graphics hardware with parallel computing resources (such as GPU 30), and the AI model management processor is configured to run a plurality of template AI models in parallel on parallel computing resources of the graphics hardware, where respective template AI models were previously trained to operate within the limits of the parallel computing resources available when running in parallel on the graphics hardware.

It will also be appreciated that such a system (or a development kit version thereof) can also be used to perform refinement training of a template non-player object behavioural AI model to tune that model to the specific requirements of the intended application, using similar techniques to those discussed elsewhere herein.

Hence in a summary embodiment of the present description, the above system may comprise the following.

Firstly, a training processor (such as CPU 20 and/or GPU 30) configured (for example by use of suitable software instruction) to provide a training virtual environment separate from the application environment.

The system is then operable in a development mode, in which the selection processor is configured to select a template non-player object behavioural AI model, the AI model being previously trained separately to the application using reinforcement learning to characterise behaviour of a respective non-player object type. Meanwhile the association processor is again configured to associate one or more non-player objects with the selected template AI model.

Then for the or each associated non-player object, the AI model management processor is configured to input training state information to an input interface of the template AI model for receiving generic state information relevant to the associated non-player object's type, the training state information corresponding to state information of the application, receive from an output interface of the template AI model non-player object state information, compare this state against a preferred state to generate a reward value, and feed the reward value back to the respective template AI model to reinforce the preferred state, as described elsewhere herein.

The update processor is again configured update the state of the respective non-player object for the training environment.

It will also be appreciated that such a system (or a development kit version thereof) can also be used to perform the previous, initial training of a template non-player object behavioural AI model using similar techniques, as discussed elsewhere herein.

It will be appreciated that the refinement training and the initial training may be implement on a separate system to the system that runs the application, and so these systems may be wholly independent (although typically it is preferable to be able to switch between training or refinement and testing, in order to see how the trained models currently cause the non-player object(s) to behave).

It will be appreciated that the above techniques and systems can advantageously provide application developers with a suite of 'off the shelf' AI brains with various different behaviours, goals, and personalities, that they can optionally refine within a separate training environment to suit their needs.

This avoids repetition of a large amount of computational overhead in the initial training of these models, and also significantly reduces the development dependency time by allowing the training and optional refinement to occur in parallel with the development of the application environment itself, rather than having to wait until the environment has been developed and then training the AI models within it. This is also helpful as often the environment may be developed to exploit or harmonise with its occupants, rather than the other way around. The optional use of an application interface and descriptive inputs that abstract aspects of the environment also reduce the dependency on having the finished environment available before testing.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of controlling at least a first non-player object within a virtual environment of an application, comprising the steps of:
   selecting a template non-player object behavioural AI model, the AI model being previously trained separately to the application using reinforcement learning to characterise behaviour of a respective non-player object type, from among a plurality of template AI models;
   associating one or more non-player objects of the application with the selected template AI model; and
   for the or each associated non-player object,
   inputting application state information to an input interface of the template AI model for receiving state information relevant to the associated non-player object's type;
   receiving from an output interface of the template AI model non-player object state information;
   updating the state of the respective non-player object for the virtual environment of the application responsive to the received non-player object state information.

2. The method of claim 1, in which the plurality of template non-player object behavioural AI models respectively characterise behaviour of one or more of:
   i. A non-goal driven ambient creature;
   ii. a goal driven ambient creature;
   iii. a prey creature; and
   iv. a predator creature.

3. The method of claim 1, in which the plurality of template non-player object behavioural AI models respectively characterise behaviour of one or more of:
   i. a member of a calm non-goal driven crowd;
   ii. a member of a calm goal driven crowd;
   iii. a member of a panicked non-goal driven crowd; and
   iv. a member of a panicked goal driven crowd.

4. The method of claim 1, in which the plurality of template non-player object behavioural AI models respectively characterise behaviour of one or more of:
   i. a vehicle; and
   ii. a structure.

5. The method of claim 1, comprising:
   providing an application interface between the application and a system managing one or more template AI models;
   the application specifying via the application interface the required number and type of template AI models and providing application state information for input by the system to respective template AI models; and
   the system providing to the application via the application interface non-player object state information.

6. The method of claim 1, comprising:
running a plurality of template AI models in parallel on parallel computing hardware to control a plurality of non-player objects; and wherein
respective template AI models were previously trained to operate with computing resources limited to those available when running on the parallel computing hardware.

7. The method of claim 1, comprising the steps of:
selecting a template non-player object behavioural AI model, the AI model being previously trained separately to the application using reinforcement learning to characterise behaviour of a respective non-player object type;
providing a training virtual environment separate from the application environment;
associating one or more non-player objects with the selected template AI model;
for the or each associated non-player object,
inputting training state information to an input interface of the template AI model for receiving generic state information relevant to the associated non-player object's type, the training state information corresponding to state information of the application;
receiving from an output interface of the template AI model non-player object state information;
comparing this state against a preferred state to generate a reward value;
feeding the reward value back to the respective template AI model to reinforce the preferred state; and
updating the state of the respective non-player object for the training environment.

8. The method of claim 1, in which:
application state information provided to an input interface of a respective template AI model comprises one or more of:
i. a flow direction of a medium comprising the non-player object;
ii. a light position or direction;
iii. a heat position or direction;
iv. a sound position or direction; and
v. a resource position or direction.

9. The method of claim 1, in which:
application state information provided to an input interface of a respective template AI model comprises one or more of:
i. a distance to a goal location;
ii. a direction to a goal location;
iii. a landscape gradient in at least current direction;
iv. a distance to a solid object in at least current direction;
v. a distance to a similar non-player object;
vi. a distance to a prey non-player object;
vii. a distance to a predator non-player object; and
viii. a distance to a player.

10. The method of claim 1, in which:
application state information provided to an input interface of a respective template AI model comprises one or more of:
i. an urgency for the non-player object to reach a goal;
ii. an urgency for the non-player object to reach a resource;
iii. a fear of an environmental feature;
iv. an attraction to an environmental feature;
v. a fear of another non-player object;
vi. an attraction to another non-player object;
vii. a preferred position relative to another non-player object; and
viii. a preferred position relative to the player.

11. The method of claim 1, in which:
received non-player object state information comprises one or more of:
i. a non-player object position;
ii. a non-player object direction;
iii. a non-player object velocity;
iv. a goal attraction value;
v. a resource attraction value;
vi. a proximity awareness value;
vii. a resource level value;
viii. a fear value; and
ix. an urgency value.

12. A non-transitory, computer readable storage medium containing a computer program comprising computer executable instructions, which when executed by a computer system, causes the computer system to perform a method of controlling at least a first non-player object within a virtual environment of an application, comprising the steps of:
selecting a template non-player object behavioural AI model, the AI model being previously trained separately to the application using reinforcement learning to characterise behaviour of a respective non-player object type, from among a plurality of template AI models;
associating one or more non-player objects of the application with the selected template AI model; and
for the or each associated non-player object,
inputting application state information to an input interface of the template AI model for receiving state information relevant to the associated non-player object's type;
receiving from an output interface of the template AI model non-player object state information;
updating the state of the respective non-player object for the virtual environment of the application responsive to the received non-player object state information.

13. A system for controlling at least a first non-player object within a virtual environment of an application, comprising:
a selection processor configured to select a template non-player object behavioural AI model, the AI model being previously trained separately to the application using reinforcement learning to characterise behaviour of a respective non-player object type, from among a plurality of template AI models;
an association processor configured to associate one or more non-player objects of the application with the selected template AI model;
for the or each associated non-player object, an AI model management processor is configured to:
input application state information to an input interface of the template AI model for receiving generic state information relevant to the associated non-player object's type; and
receive from an output interface of the template AI model non-player object state information; and
an update processor configured to update the state of a respective non-player object for the virtual environment of the application responsive to the received non-player object state information.

14. The system of claim 13, comprising
graphics hardware with parallel computing resources; and in which
the AI model management processor is configured to run a plurality of template AI models in parallel on parallel computing resources of the graphics hardware; and respective template AI models were previously trained to operate within the limits of the parallel computing resources available when running in parallel on the graphics hardware.

15. The system of claim 13, comprising
an training processor configured to provide a training virtual environment separate from the application environment;
the system being operable in a development mode in which:
the selection processor is configured to select a template non-player object behavioural AI model, the AI model being previously trained separately to the application using reinforcement learning to characterise behaviour of a respective non-player object type;
the association processor configured to associate one or more non-player objects with the selected template AI model;
for the or each associated non-player object, the AI model management processor is configured to:
input training state information to an input interface of the template AI model for receiving generic state information relevant to the associated non-player object's type, the training state information corresponding to state information of the application;
receive from an output interface of the template AI model non-player object state information;
compare this state against a preferred state to generate a reward value; and
feed the reward value back to the respective template AI model to reinforce the preferred state; and
the update processor is configured update the state of the respective non-player object for the training environment.

* * * * *